US012109912B2

(12) United States Patent
Agnihotri et al.

(10) Patent No.: US 12,109,912 B2
(45) Date of Patent: Oct. 8, 2024

(54) MANIFOLD BRACKET

(71) Applicant: Rivian IP Holdings, LLC, Irvine, CA (US)

(72) Inventors: Shubham Agnihotri, Irvine, CA (US); Casey Dunn, Mission Viejo, CA (US); Fwutsai Kuo, Laguna Hills, CA (US); Matt Pruett, Long Beach, CA (US); Brandon Thayer, Aliso Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 184 days.

(21) Appl. No.: 17/852,656

(22) Filed: Jun. 29, 2022

(65) Prior Publication Data

US 2024/0001806 A1 Jan. 4, 2024

(51) Int. Cl.
*B60L 58/26* (2019.01)
*B60L 50/60* (2019.01)
*F16L 3/00* (2006.01)
*B60K 11/02* (2006.01)
*F16L 3/13* (2006.01)
*H01M 10/625* (2014.01)

(52) U.S. Cl.
CPC .............. *B60L 58/26* (2019.02); *B60L 50/66* (2019.02); *B60K 11/02* (2013.01); *B60Y 2410/113* (2013.01); *F16L 3/13* (2013.01); *H01M 10/625* (2015.04)

(58) Field of Classification Search
CPC .......... B60L 58/26; B60L 50/66; B60L 50/64; F16L 3/00; F16L 3/13; F16L 5/00; F16L 37/50; F16L 37/00; F16L 3/237; H01M 10/625; H01M 10/249; H01M 10/6556; H01M 50/291; H01M 50/249; H01M 10/613; H01M 10/6557; B60K 11/02; B60K 1/04; B60Y 2410/113
See application file for complete search history.

(56) References Cited

U.S. PATENT DOCUMENTS

| 4,379,536 | A | * | 4/1983 | Mizuno | F16L 3/10 403/397 |
|---|---|---|---|---|---|
| 5,593,115 | A | * | 1/1997 | Lewis | F16L 3/227 248/200.1 |
| 5,626,316 | A | * | 5/1997 | Smigel | H02G 3/32 248/68.1 |
| 7,422,181 | B2 | * | 9/2008 | Sßenbach | B60T 17/046 174/664 |
| 8,056,868 | B2 | * | 11/2011 | Vander Griend | F16L 3/1075 248/68.1 |
| 8,157,222 | B1 | * | 4/2012 | Shirey | H02G 3/32 248/68.1 |

(Continued)

*Primary Examiner* — Tan Le
(74) *Attorney, Agent, or Firm* — Foley & Lardner LLP

(57) ABSTRACT

An apparatus can include a body. The body can include a top portion and a base. The top portion can define a cavity. The cavity can be configured to receive a component. The apparatus can include a spring element that extends from at least one of the top portion and the base of the body. The spring element can be disposed at least partially around the cavity. The spring element can be configured to bias the component to an initial position and facilitate movement of the component when a load is applied to the component.

19 Claims, 11 Drawing Sheets

(56) References Cited

U.S. PATENT DOCUMENTS

| | | | | |
|---|---|---|---|---|
| 2015/0108287 | A1* | 4/2015 | Arai | H05K 5/0204 |
| | | | | 248/65 |
| 2017/0350539 | A1* | 12/2017 | Leo, Sr. | F16L 3/237 |
| 2020/0119417 | A1* | 4/2020 | Masaryk | H01M 10/6567 |
| 2023/0311630 | A1* | 10/2023 | Dunn | B60K 1/04 |
| 2023/0420787 | A1* | 12/2023 | Baseri | H01M 10/6556 |

* cited by examiner

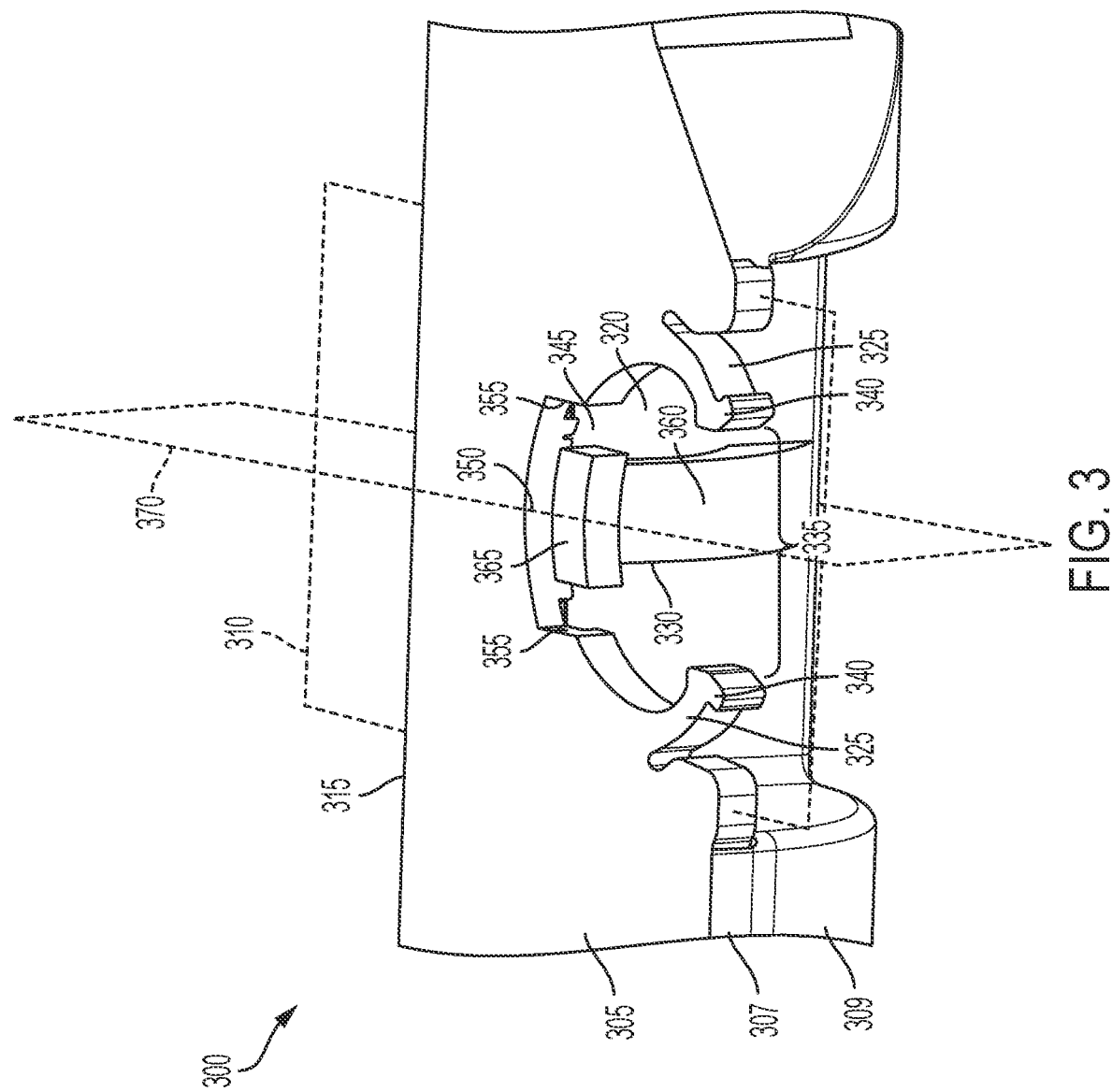

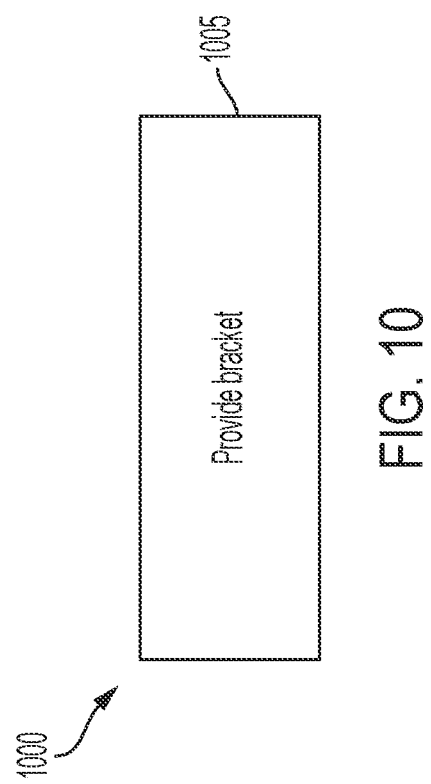

MANIFOLD BRACKET

INTRODUCTION

Battery packs can be a source of electrical power. Battery packs can be assembled from various components.

SUMMARY

Various components can be connected together when connection points are aligned properly. Alignment can be difficult to achieve without some allowance for offsets. The technical solution described herein provides a bracket that can bias a component to a desired initial position and facilitate movement of the component to accommodate an initial misalignment between the component and a corresponding connecting component. The component can move into alignment with the corresponding connecting component when a load is applied to the component. The use of the bracket can improve a quality of a connection between the component and the corresponding connecting component by facilitating movement of the component to create a better alignment.

At least one aspect is directed to an apparatus. The apparatus can include a body. The body can include a top portion and a base. The top portion can define a cavity. The cavity can be configured to receive a component. The apparatus can include a spring element that extends from at least one of the top portion and the base of the body. The spring element can be disposed at least partially around the cavity. The spring element can be configured to bias the component to an initial position and facilitate movement of the component with a load is applied to the component.

At least one aspect is directed to a method. The method can include biasing a component to an initial position within a cavity of an apparatus. The apparatus can comprising a body comprising a top portion and a base. The top portion can define the cavity. The cavity can be configured to receive the component. The apparatus can include a spring element extending from at least one of the top portion and the base of the body. The spring element can be disposed at least partially around the cavity. The spring element can be configured to bias the component to the initial position and facilitate movement of the component within the cavity. The method can include facilitating movement of the component within the cavity.

At least one aspect is directed to a system. The system can include a member. The system can include a bracket integral with the member. The bracket can comprise a body defining a cavity. The cavity can be configured to receive a component. The bracket can comprise a spring element extending from the body. The spring element can be disposed, at least partially, around the cavity. The spring element can be configured to bias the component to an initial position and facilitate movement of the component with a load is applied to the component.

At least one aspect is directed to an electric vehicle. The electric vehicle can include a battery pack. The battery pack can include a member, a fluid conduit to couple with the member via a connector, and a thermal component to fluidly couple with the fluid conduit via the connector. The member can include a bracket. The bracket can include a body. The body can define a cavity. The cavity can receive the connector. The bracket can include a spring element. The spring element can extend from the body. The spring element can be disposed at least partially around the cavity. The spring element can bias the connector to an initial position and facilitate movement of the connector when a port of the thermal component applies a load to the connector. The movement is to align the connector with the port of the thermal component.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 depicts a perspective view of an example bracket, in accordance with some aspects.

FIG. 10 depicts a flow diagram illustrating an example method to provide a bracket, in accordance with some aspects.

DETAILED DESCRIPTION

Figure 1:
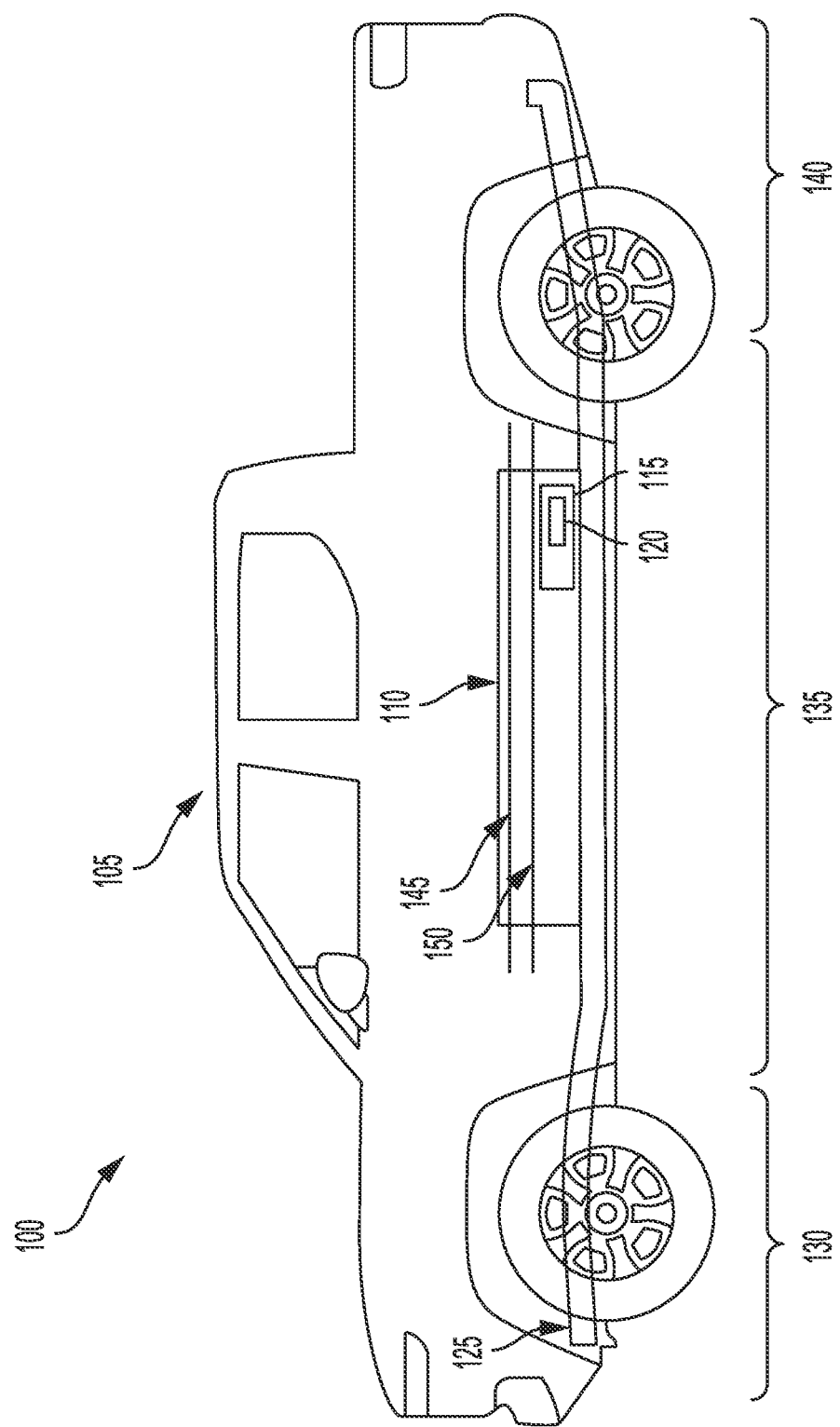
FIG. 1 depicts a side view of an example electric vehicle, in accordance with some aspects.

Following below are more detailed descriptions of various concepts related to, and implementations of, methods, apparatuses, and systems of a bracket that for example can be installed in or part of an electric vehicle battery pack. The various concepts introduced above and discussed in greater detail below may be implemented in any of numerous ways.

The present disclosure is generally directed to systems and methods of using a bracket to provide positional control to a component received by the bracket as well as facilitate movement of the component within the bracket to facilitate proper alignment and connection between the component and a corresponding connecting component. The disclosed solutions can have a technical advantage of achieving positional control of a connector while still facilitating movement of the connector to accommodate for misalignments during assembly of a battery cooling system.

The disclosed solution can include at least one bracket. The bracket can define a cavity configured to receive a connector. The bracket can be a part of a member. For example, the bracket can be coupled with the member or integrally formed with the member. The bracket can have at least one spring element. The spring element can bias the connector to an initial position. For example, the spring element can provide enough resistance to hold the connector in a desired position when the connector is disposed in the bracket. The spring element can also provide enough flexibility to allow movement of the connector when the connector is disposed in the bracket. For example, when engaging an external element (e.g., a fluid port) with the connector and the external element is not aligned with the connector, the connector can move radially within the bracket to correct the misalignment.

The bracket can have a plurality of spring elements. For example, the bracket can have a first spring element, a second spring element, and a third spring element. The first and second spring elements can be a first and second projection (e.g., a finger) that extends around a circumference of the cavity. The first and second projections can define an opening at the front of the bracket. The first and second projections can be flexible enough to facilitate entry of the connector into the cavity of the bracket as well as rigid enough to facilitate maintaining the connector in a desired initial position (e.g., centered within the bracket). The third spring element can be or include a spring tab. The spring tab can be disposed at a back of the bracket, opposite the opening. The spring tab can be rigid enough to maintain the position of the connector when the connector is in the bracket. The first and second projections and the spring tab can be flexible enough to facilitate movement of the connector when a pressure is applied to the connector. For example, the projections and the spring tab can facilitate radial movement of the connector when pressure is applied to the connector. For example, when an external element is engaging with the connector and the external element is not directly aligned with the connector, the connector can move radially within the bracket via the projections and the spring tab to accommodate the misalignment.

The disclosed solutions have a technical advantage of achieving positional control of a connector of a battery cooling system and still accommodating misalignment of components during assembly of the system. This control and accommodation can achieve a more reliable battery coolant connection to help prevent leakage of coolant within the system. The disclosed solution provides a bracket that is strong enough to bias a connector to a predetermined initial position, but is also flexible enough for the connector to move when the connector is in the bracket such that the connector can align with an external component. For example, the component can receive a fluid port of a thermal component. If the connector is not aligned with a central axis of the fluid port when connecting the fluid port to the connector, the connector can move radially within the bracket to account for and correct the misalignment.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
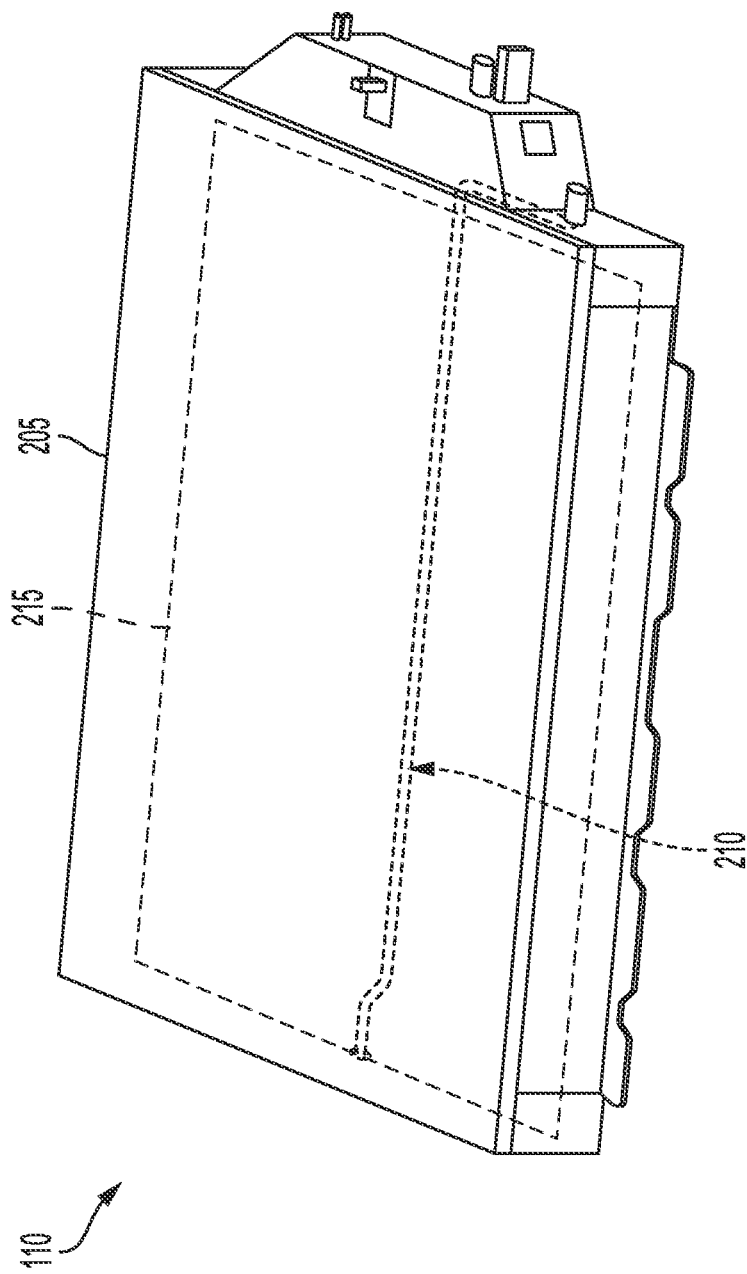
FIG. 2A depicts an example battery pack, in accordance with some aspects.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. While the cooling line 210 and the thermal component 215 can refer to cooling functions, the same or similar components can be used for other thermal functions, such as, for example, providing heat the battery pack 110. For example, when the battery pack 110 is exposed to cold temperatures, the cooling line 210 and thermal component 215 can provide heat to the battery pack 110 to prevent a temperature of the battery pack 110 and any internal components (e.g., the battery modules 115) from falling below a temperature threshold. In some instances, the thermal component 215 may be positioned in relation to a top submodule and a bottom submodule, such as in between the top and bottom submodules, among other possibilities. The battery pack 110 can include any number of thermal components 215. For example, there can be one or more thermal components 215 per battery pack, or per battery module 115. The cooling line 210 can be coupled with, part of, or independent from the thermal component 215.

Figure 2B:
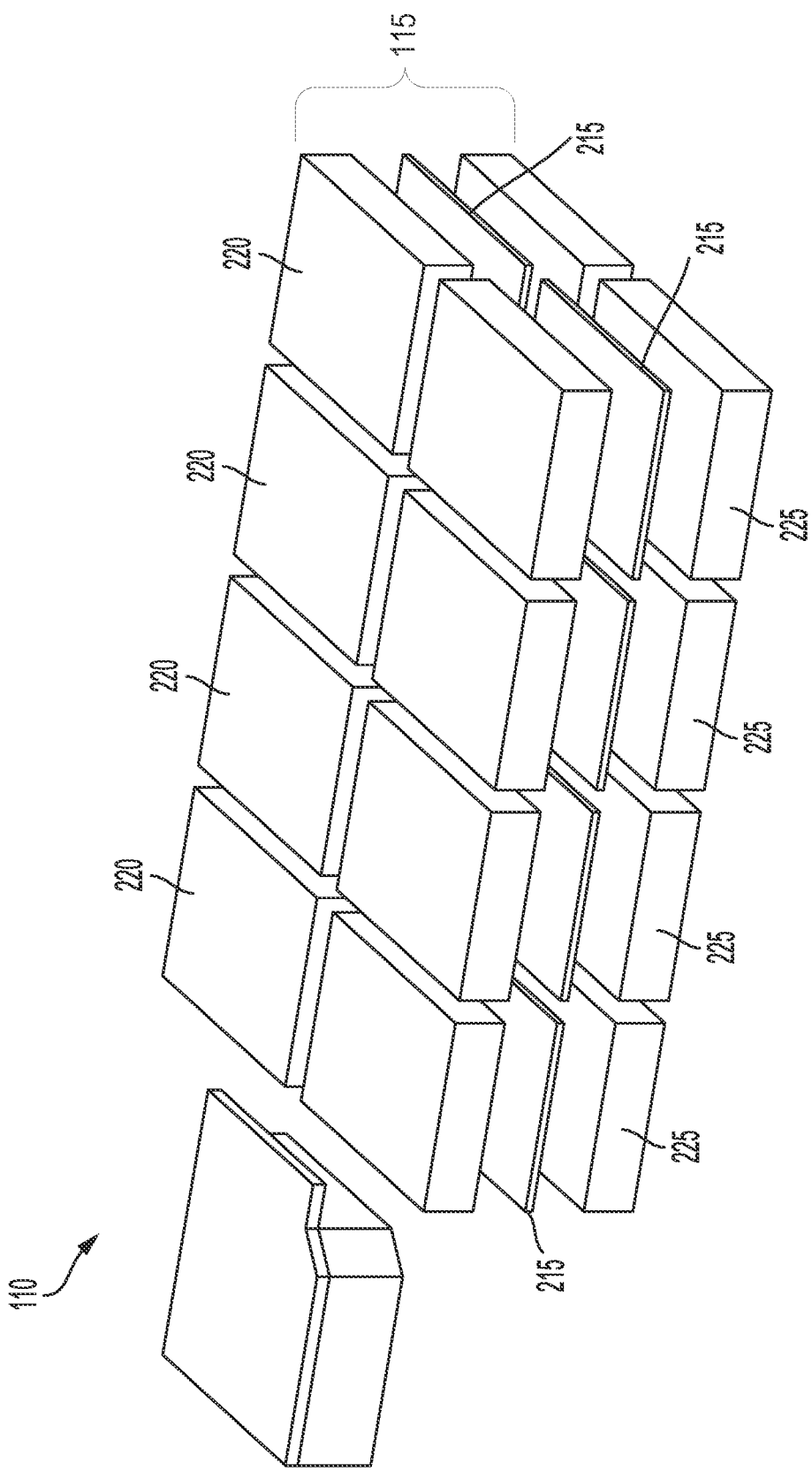
FIG. 2B depicts example battery modules, in accordance with some aspects.

FIG. 2B depicts example battery modules 115. The battery modules 115 can include at least one submodule. For example, the battery modules 115 can include at least one top submodule 220 or at least one bottom submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells, prismatic cells, or pouch cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. The battery pack 110 can include any number of thermal components 215. For example, the battery pack 110 can include one thermal component 215 for the entire battery pack 110, one thermal component 215 for each battery module 115, a plurality of thermal components 215 for each battery module 115, or one thermal component 215 for a subset of the plurality of battery modules 115. It should also be noted that each battery module 115 may include a top submodule 220 and a bottom submodule 225, possibly with a thermal component 215 in between the top submodule 220 and the bottom submodule 225. The battery pack 110 can include or define a plurality of areas (e.g., bays, pods, etc.) for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

FIG. 3 depicts an example apparatus. The apparatus can be or include at least one bracket 300. Bracket 300 can include at least one body 305. The body 305 can include a top portion 307. The top portion 307 can have, for example, a planar structure that defines a plane 310. For example, the plane 310 can be a horizontal plane. The body 305 can include a base 309. The base 309 can extend away from the top portion 307. The base 309 can be coupled with, or integral with, the top portion 307. The body 305 can be a part of a member 315. For example, the body 305 can couple with or be integral with the member 315. The member 315 can be a structural or functional component of a battery pack 110. For example, the member 315 can facilitate a fluid coupling between a fluid line (e.g., cooling line 210) and a thermal component 215 (e.g., a cold plate) of the battery pack via the bracket 300. The member 315 can be coupled with, or integral with, a plurality of bodies 305 (e.g., a plurality of brackets 300). The body 305 can define at least one cavity 320. For example, the top portion of the body 305 can define the cavity 320. The cavity 320 can receive at least one component. The component can be any element. For example, for battery pack 110, the component can be a connector, a pipe, or an electrical conduit, among others. The component can be disposed in the cavity 320 and be surrounded, at least partially, by the body 305.

The bracket 300 can include at least one spring element, such as spring projection 325 and spring tab 330. The spring element 325, 330 can be any element that can have an initial configuration (e.g., position, orientation), that can be moved from the initial configuration to a second configuration, and then return to the initial configuration. For example, the spring element 325 can be a spring, a spring coupled within another element, or any flexible element. The spring projection 325 can extend from, or be an extension of, the body 305. For example, the spring projection 325 can extend from the top portion 307 of the body 305. The spring projection 325 can be disposed in a horizontal plane. For example, the spring projection 325 can be disposed in the same plane 310 as the top portion 307 of the body 305. The spring projection 325 can be coupled with the body 305 or be integrally formed with the body 305 (e.g., make up a single component). The spring projection 325 can be disposed, at least partially, around the cavity 320 of the body 305. The body 305 can include a plurality of spring projections 325. For example, the body 305 can have two spring projections 325. A first spring projection 325 can extend around a portion of a first side of the cavity 320 toward a front of the body 305 and a second spring projection 325 can extend around a portion of a second side of the cavity 320 toward the front of the body 305. The first and second spring projections 325 can define an opening 335 at the front of the body 305. For example, the first spring element 325 and the second spring element 325 can be disposed on opposing sides of the body 305. The first and second spring elements 325 can extend toward the front of the body 305 and inward toward each other to define the opening 335. The opening 335 can provide access for a component to enter the cavity 320 of the bracket 300. The first spring element 325 can have a first tip 340 and the second spring element 325 can have a second tip 340. The first and second spring elements 325 can extend such that the tips 340 do not contact each other and there is a space between the tips 340. The opening 335 to the cavity 320 can be defined as the space between the first tip 340 and the second tip 340.

The spring tab 330 can be disposed, at least partially, at a rear of the cavity 320. For example, the body 305 can define a recess 345. The recess 345 can be disposed at the rear of the cavity 320. The recess 345 can be disposed opposite the opening 335. The recess 345 can be defined by a rear wall 350, a first sidewall 355, and a second sidewall 355. At least a portion of the spring tab 330 can be disposed in the recess 345. For example, the spring tab 330 can include a stem portion 360 and a head portion 365. The head portion 365 can be disposed in the recess 345. The head portion 365 can be spaced apart from the rear wall 350 and the sidewalls 355. The head portion 365 can define a back portion of the cavity 320. The head portion 365 can be disposed in the plane 310 defined by the top portion 307 of the body 305. For example, the head portion 365 can be in the same plane 310 as a spring projection 325. The stem portion 360 can extend from the head portion 365 to a location not in the plane 310. For example, the stem portion 360 can extend away from the head portion 365 to couple with the base 309 of the body 305 that is disposed outside of (e.g., below or above) the plane 310. For example, the stem portion 360 can extend from a bottom edge of the base 309 toward the plane 310 of the top portion 307 such that the head portion 365 is disposed in the plane 310.

The head portion 365 can also include a spring (or other compressible or flexible element) instead of, or in addition to, the stem portion 360. For example, a spring can extend from the rear wall 350 of the recess 345 toward the cavity 320. The head portion 365 can be disposed at an end of the spring to define the rear portion of the cavity 320.

The bracket 300 can include a plurality of spring elements 325, 330. The plurality of spring elements 325, 330 can be disposed, at least partially, around the cavity 320 of the bracket 300. The bracket 300 can include any combination of spring elements 325, 330. For example, the bracket 300 can include a first spring element 325, 330, a second spring element 325, 330, and a third spring element 325, 330. The first and second spring elements 325, 330 can be a first and second spring projection 325. The first and second spring projections 325 can define the opening 335 at the front of the body 305. The opening 335 can provide a component access to the cavity 320. The first and second spring projections 325 can horizontally flex within a first plane. For example, the first and second spring projections 325 can flex in plane 310. The third spring projection 325, 330 can be a spring tab 330. The spring tab 330 can vertically flex in a second plane. For example, spring tab 330 can flex in plane 370. Plane 370 can be perpendicular (+/−10%) to plane 310. A portion of the spring tab 330 can be disposed in the plane 310. The body 305 can define a recess 345. The recess 345 can be disposed at a rear of the cavity 320 opposite the opening 335. The spring tab 330 can be disposed, at least partially, in the recess 345. For example, the head portion 365 of the spring tab 330 can be disposed in the recess 345.

The spring elements 325, 330 can bias to an initial spring position. For example, when no external force, or an amount of force that is less than a predetermined threshold force, is applied to a spring projection 325, the spring projection 325 can remain in an initial spring position. When no external force, or an amount of force that is less than a predetermined threshold force, is applied to a spring tab 330, the spring tab 330 can be in initial spring position. The initial spring position for either spring element 325, 330 can define a desired shape of the cavity 320. For example, an initial spring position for the spring projection 325 can include a first radius of curvature of the spring projection 325. An initial spring position for the spring tab 330 can be a first distance between the head portion 365 and the rear wall 350.

The spring elements 325, 330 can flex (e.g., bend, move, displace) to a second position. For example, when an external force, or an amount of force that is greater than a predetermined threshold force, is applied to a spring projection 325, the spring projection 325 can flex, at least partially, in the direction of the force. For example, the spring projection 325 can flex within the plane 310. When an external force, or an amount of force that is greater than a predetermined threshold force, is applied to a spring tab 330, the spring tab 330 can flex in the direction of the force. For example, the spring tab 330 can flex within a different plane (e.g., plane 370). Plane 310 can be a horizontal plane and plane 370 can be a vertical plane that is perpendicular to the horizontal plane.

Figure 4:
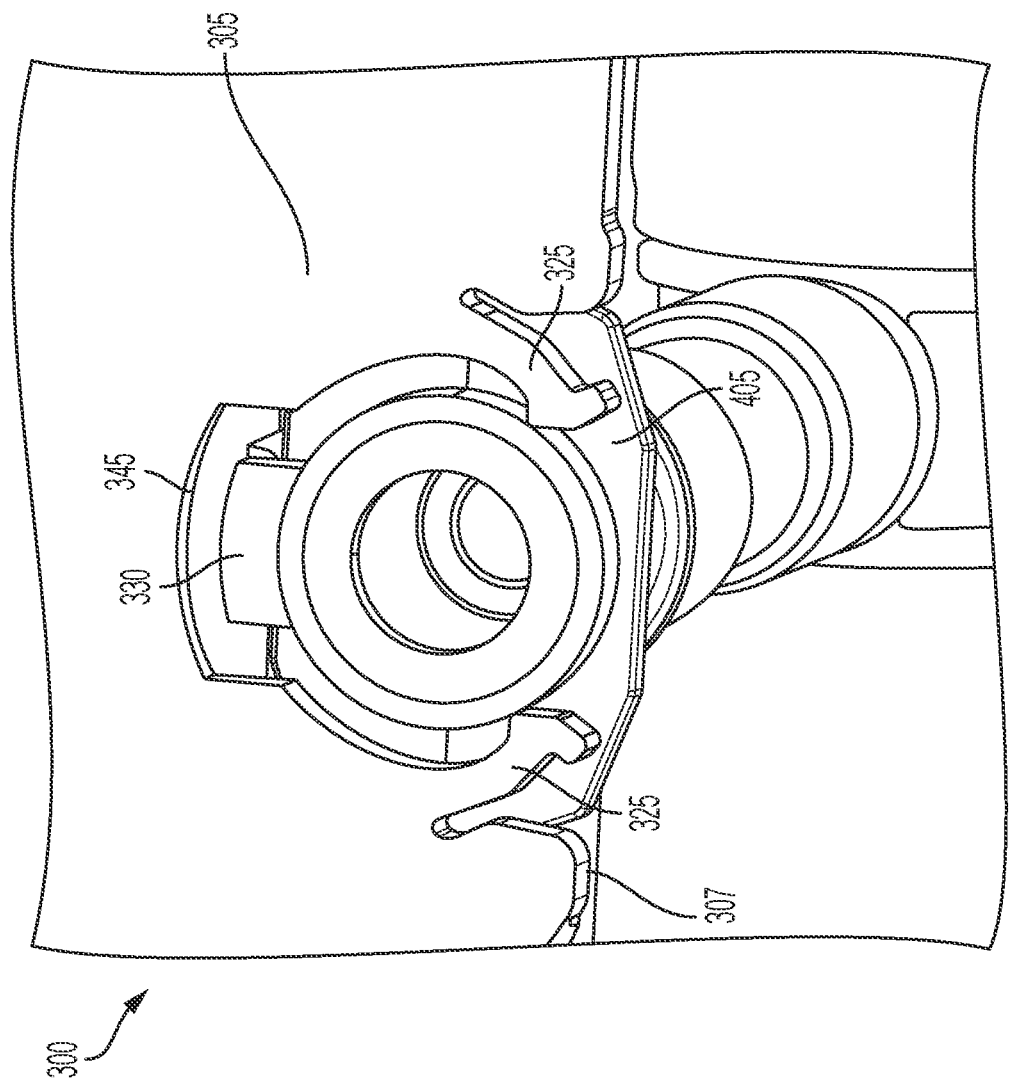
FIG. 4 depicts a top perspective view of an example bracket, in accordance with some aspects.

FIG. 4 depicts an example bracket 300 with a component, shown as connector 405, disposed, at least partially, within the cavity 320. The connector 405 can be, for example, a blind-mate. The blind-mate can fluidly couple an external component (e.g., a thermal component 215 such as a cold plate) of a battery pack with a fluid line (e.g., a coolant manifold, a cooling line 210). The connector 405 can have a groove or pocket configured to receive or interface with the at least one spring element 325, 330. The spring elements 325, 330 can provide positional control for the connector 405. For example, the spring elements 325, 330 can bias the connector 405 to enable movement of the connector 405. The spring elements 325, 330 of the bracket 300 can bias the connector 405 to an initial component position within the cavity 320. For example, the initial component position can be a central position within the cavity 320. With the connector 405 in the cavity 320, the spring elements 325, 330 can cause the connector 405 to be disposed at a center of the cavity 320. The spring elements 325, 330 can also facilitate or enable movement of the connector 405 to facilitate proper alignment between the connector 405 and an external component (e.g., a corresponding connecting component). The corresponding connecting component can have, for example, a port configured to be received by the connector 405. Aligning the port and the connector 405 can provide a seal between the two components to increase the likelihood that fluid (e.g., coolant) flowing between the port and the connector 405 remains in the system and is not spilled or leaked.

The spring elements 325, 330 can flex and facilitate movement of the connector 405 when a load is applied to the connector 405. For example, the movement of the connector 405 can include a radial movement within the cavity 320. The spring elements 325, 330 can facilitate the radial movement of the connector 405 within the cavity 320. For example, the connector 405 can travel up to 2 mm in any radial direction within the cavity 320. The radial movement of the connector 405 can facilitate proper alignment between the connector 405 and the corresponding connecting component to facilitate a proper connection between the connector 405 and the corresponding connecting component. For example, a port of the corresponding connecting component can attempt to enter the connector 405. With a slight misalignment, the port can apply a load to the connector 405 that pushes the connector 405 to move to better align with the port. The force on the connector 405 can be transferred or applied to the spring elements 325, 330 such that the spring elements 325, 330 flex and move and allow the connector 405 to align with the port in response to the applied load.

Figure 5:
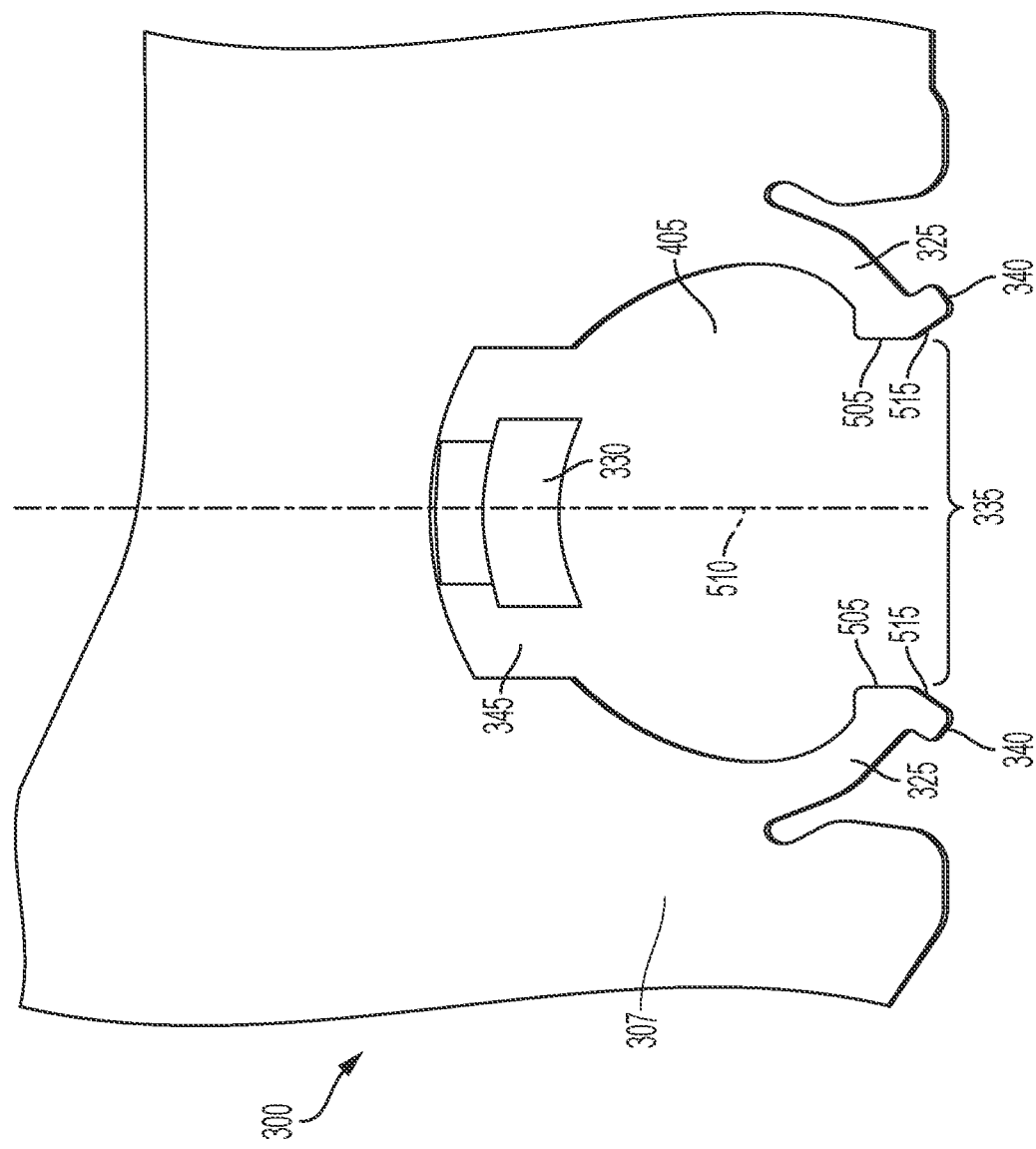
FIG. 5 depicts a top view of an example bracket, in accordance with some aspects.

FIG. 5 depicts a top view of an example bracket 300. The bracket 300 can receive the connector 405 within the cavity 320 via the opening 335. The spring projections 325 can flex in order to adjust a size of the opening 335 to allow enough space for the connector 405 to enter the cavity 320. For example, the first and second spring projections 325 can be in an initial position and define the opening 335. The opening 335 can have an initial length. The first and second spring projections 325 can flex (e.g., move, bend, curve, retract) in a radial direction to increase the length of the opening 335 to allow enough room for the connector 405 to enter the cavity 320. For example, the spring projections 325 can flex in a radial direction within the plane 310 when a force is applied to the spring projections 325. The force can be from the connector 405 contacting the tips 340 of the spring projections 325. For example, the connector 405 can apply an outward or radial force on the tips 340 of the spring projections 325 when entering the cavity 320. The force can cause the spring projections 325 to flex outward or in a radial direction to increase the size of the opening 335 to allow the component to enter the cavity 320.

The first tip 340 and the second tip 340 of the first and second spring projections 325, or at least a portion of the tips 340, can be angled outward (e.g., away from the opening 335) to facilitate entry of the connector 405 into the cavity 320. For example, a first tip 340 of the first spring projection 325 can have a first tip portion 505 that is parallel with a first tip portion 505 of an opposing second tip 340 of the second spring projection 325. The first tip portion 505 can be parallel with a central axis 510 of the bracket 300. The first and second tips 340 can each have a second tip portion 515 that is disposed at an angle from the first tip portion 505. The second tip portion 515 of the first and second tips 340 can be angled outward, away from the opening 335. The angled second tip portions 515 can facilitate easier entry of the connector 405 into the cavity 320. For example, the connector 405 can slide along the second tip portions 515 and apply a force to the first and second spring projections 325 that can cause the first and second spring projections 325 to flex outward until the connector 405 can slide through the opening 335 and into the cavity 320. With the connector 405 in the cavity 320, the spring projections 325 can position the connector 405 in a predetermined initial component position (e.g., centered in the cavity 320).

The spring elements 325, 330 can comprise any material that is strong enough to maintain a rigid shape and flexible enough such that the spring elements 325, 330 can flex or move when a force (that exceeds a predetermined threshold) is applied. For example, the spring elements 325, 330 can be a plastic, metal, rubber, or other material. The spring elements 325, 330 can be the same material or different than the body 305. For example, the body 305 can comprise a more rigid material since the body 305 cannot flex.

Figure 6:
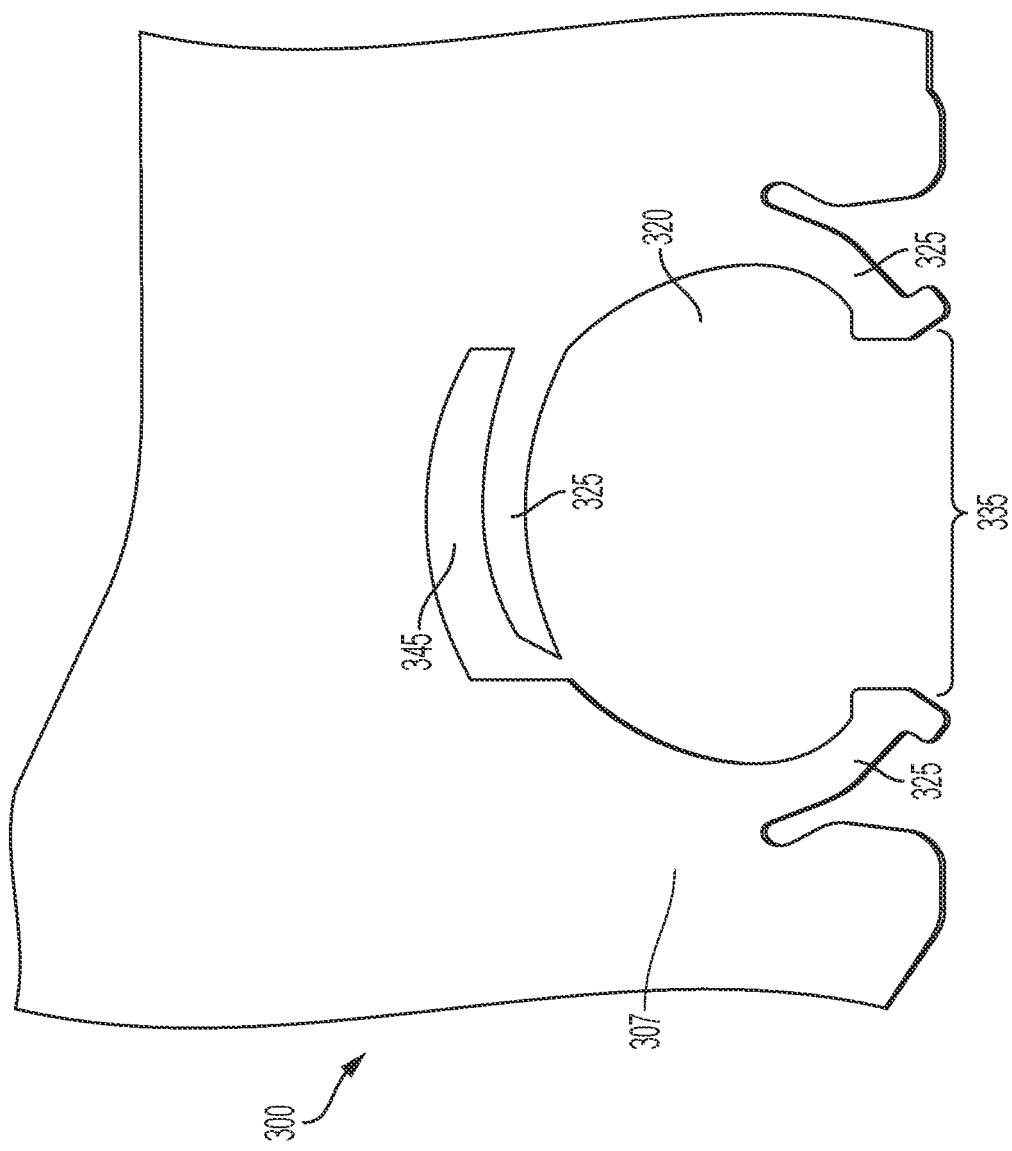
FIG. 6 depicts a top view of an example bracket, in accordance with some aspects.

FIG. 6 depicts an example bracket 300. Bracket 300 can include a plurality of spring elements. For example, bracket 300 can include a plurality of spring projections 325. For example, bracket 300 can include a first spring projection 325, a second spring projection 325, and a third spring projection 325. The spring projections 325 can extend from the body 305 of the bracket 300. The spring projections 325 can flex within a plane 310. The first spring projection 325 can be disposed on a first side of the body 305. The second spring projection 325 can be disposed on a second side of the body 305. The first side can be opposing the second side. The third spring projection 325 can be disposed on a third side of the body 305. The third side can be a rear of the body 305. The third spring projection 325 can be disposed, at least partially, within a recess 345 of the body 305. All of the spring projections 325 can have a tip 340. All the tips 340 can be the same, different, or a combination there of. For example, a tip 340 of the first spring projection 325 and the second spring projection 325 can have the first tip portion 505 and the second tip portion 515 to facilitate entry of the connector 405 into the cavity 320. The tip 340 of the third spring projection 325 cannot facilitate entry of the connector 405 into the cavity 320 such that the tip 340 of the third spring projection 325 cannot have a second tip portion 515. The third spring projection 325 can define, at least a portion, of the back of the cavity 320. Each of the three spring projections 325 can facilitate radial movement of a connector 405 disposed in the cavity 320 by flexing in a plane (e.g., plane 310).

Figure 7:
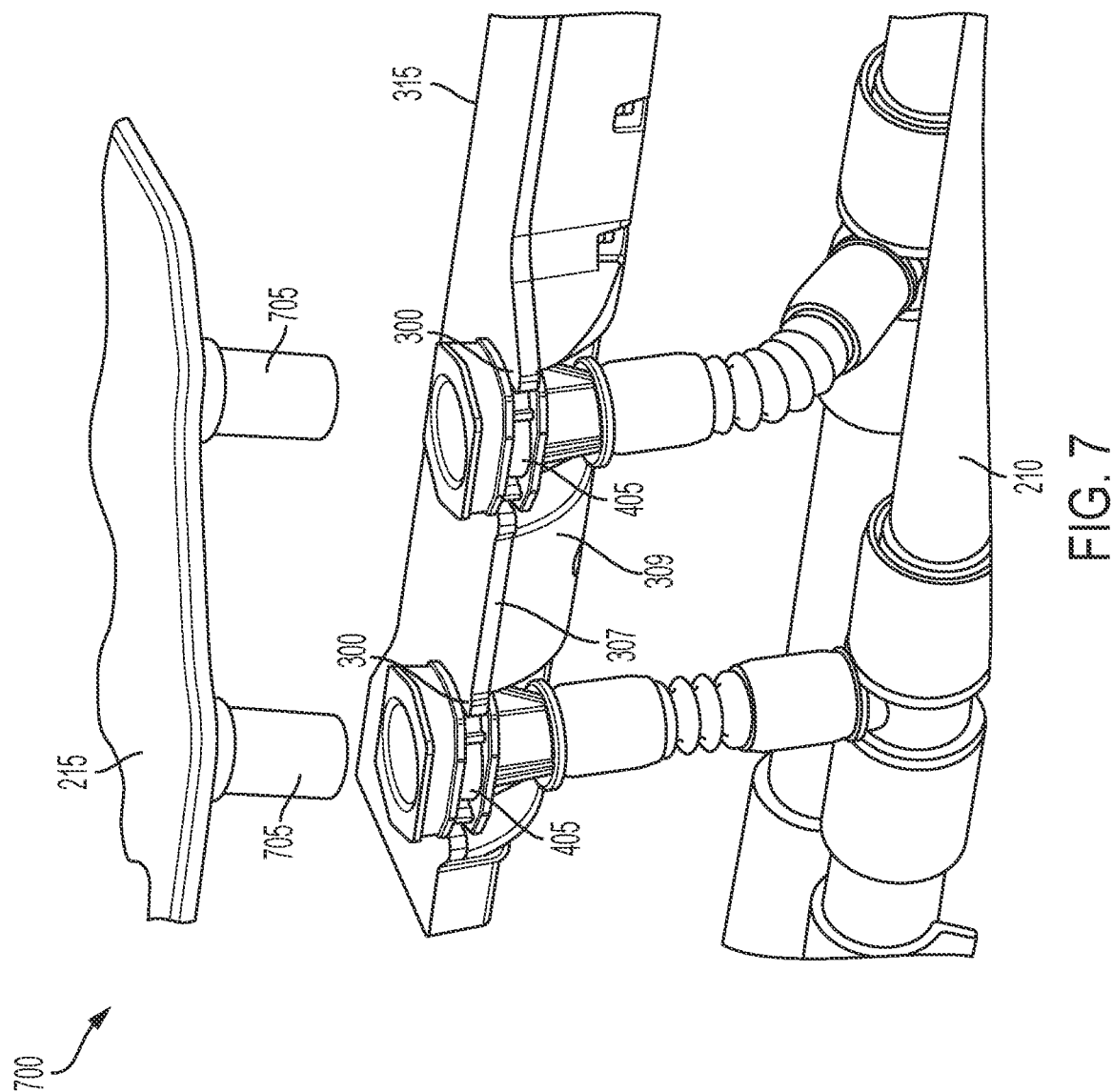
FIG. 7 depicts a perspective view of an example system, in accordance with some aspects.

FIG. 7 depicts an example system 700. System 700 can include at least one member 315. The member 315 can be a structural or operational component of a battery pack. System 700 can include at least one bracket 300 coupled with or integral with the member 315. The bracket 300 can include a body 305. The body 305 can define a cavity 320. The cavity 320 can receive a connector 405. The bracket 300 can include a spring element 325, 330. The spring element 325, 330 can extend from the body 305. The spring element 325 can be disposed, at least partially, around the cavity 320. The spring element 325, 330 can bias the connector 405 to an initial position and facilitate movement of the connector 405 when a load is applied to the connector 405. The initial position can be a central position within the cavity 320. The movement of the connector 405 can include a radial movement within the cavity 320.

The bracket 300 can include a plurality of spring elements 325, 330. For example, the bracket 300 can include a first, second, and third spring element 325, 330. The first and second spring elements 325, 330 can extend from the body 305 and flex within a horizontal plane. For example, the first and second spring elements can be a first and second spring projection 325. The first and second spring projections 325 can flex in plane 310. The first and second spring projections 325 can define an opening 335 at a front of the body 305. The opening 335 can provide the connector 405 access to the cavity 320. The third spring element 325, 330 can extend from the member 315 and flex in a vertical plane. For example, the third spring element can be a spring tab 330. The spring tab 330 can flex in plane 370. At least a portion of the spring element can be disposed in the horizontal plane. The body 305 can define a recess 345. The spring tab 330 can be disposed, at least partially, in the recess 345. The recess 345 can be disposed at a rear of the body 305 opposite the opening 335.

System 700 can include at least one fluid conduit, shown as cooling line 210. System 700 can include at least one thermal component 215. The thermal component 215 can be, or can be coupled with, a cold plate. The member 315 can include a plurality of brackets 300. For example, the member 315 can include a first bracket 300 and a second bracket 300. Each bracket 300 can receive a connector 405. Each bracket 300 can position the corresponding connector 405 to couple with the thermal component 215. For example, the thermal component 215 can have a first fluid port 705 and a second fluid port 705. The first bracket 300 can position a first connector 405 in a predetermined position that is based on a predicted position of the first fluid port 705. The second bracket 300 can position a second connector 405 in a predetermined position that is based on a predicted position of the second fluid port 705.

The spring elements 325, 330 of the brackets 300 facilitate radial movement of the connectors 405 if the connectors 405 are not aligned with the fluid ports 705. For example, if a connector 405 is not aligned with a central axis of a fluid port 705, the fluid port 705 can apply enough force on the connector 405 to flex the appropriate spring elements 325, 330 such that the connector 405 can move radially within the cavity 320 of the bracket 300 and align with the central axis of the fluid port 705.

System 700 can be disposed in a battery pack 110 of an electric vehicle 105. The battery pack 110 can include a member 315, a fluid conduit, shown as cooling line 210, to couple with the member 315 via a connector 405, and a thermal component 215 to fluidly couple with the cooling line 210 via the connector 405. The member 315 can include at least one bracket 300. The bracket 300 can include a body 305. The body can define a cavity 320. The cavity 320 can receive the connector 405. The bracket 300 can include a spring element 325, 330. The spring element 325, 330 can extend from the body 305. The spring element 325, 330 can be disposed at least partially around the cavity 320. The spring element 325, 330 can bias the connector 405 to an initial position and facilitate movement of the connector 405 when a fluid port 705 of the thermal component 215 applies a load to the connector 405. The movement is to align the connector 405 with the fluid port 705 of the thermal component 215.

Figure 8:
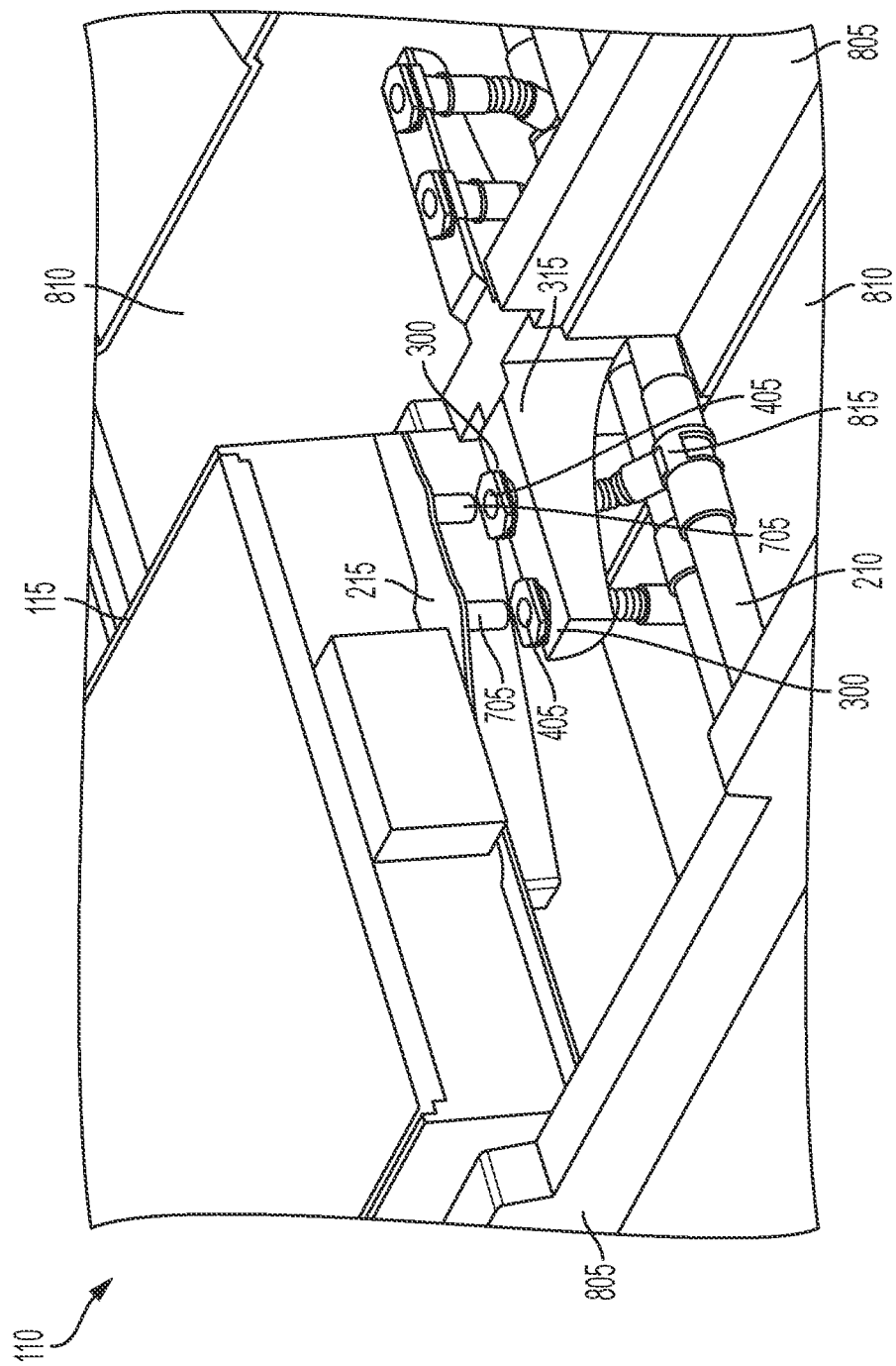
FIG. 8 depicts a perspective view of an example battery pack, in accordance with some aspects.

FIG. 8 depicts an example battery pack 110. The battery pack 110 can be a battery pack 110 of an electric vehicle 105. The battery pack 110 can include at least one structural member 805. The structural member 805 can provide support or structure for the battery pack 110. The structural member 805 can define a compartment 810 (e.g., pocket, area) for a battery module 115. For example, the battery pack 110 can include at least one battery module 115. The battery module 115 can be disposed in the compartment 810 defined by the structural member 805.

The battery module 115 can include at least one top submodule 220 and at least one bottom submodule 225. A thermal component 215 can be disposed between the top submodule 220 and the bottom submodule 225. For example, the thermal component 215 can be a cold plate that cools the battery module 115. The thermal component 215 can have or be coupled with at least one port 705. The port 705 can fluidly couple a cooling line 210 of the battery pack 110 with the thermal component 215.

The battery pack 110 can include bracket 300. Bracket 300 can have a body 305 that is integral with, or coupled with, a member 315. The member 315 can be supported by at least one structural member 805 of the battery pack 110. For example, at least one portion of the member 315 interfaces with, and is supported by, the structural member 805. The member 315 can extend from the structural member 805 into the compartment 810. For example, the member 315 can extend partially through the compartment 810 or can extend across the entire compartment 810. The bracket 300 can receive a connector 405. The member 315 can position the connector 405 at a location within the battery pack 110 to align with the port 705 of the thermal component 215. The connector 405 can receive the port 705.

The battery pack 110 can include a cooling line 210. The cooling line 210 can carry fluid (e.g., coolant) to or from components of the battery pack 110. The cooling line 210 can be fluidly coupled with the thermal component 215. For example, the port 705 of the thermal component 215 can couple with the connector 405. The port 705 and the connector can fluidly couple the cooling line 210 with the thermal component 215.

The battery pack 110 can include a plurality of structural members 805. The plurality of structural members 805 can define a plurality of compartments 810. The battery pack 110 can include a plurality of battery modules 115 to be disposed in the plurality of compartments 810. The battery modules 115 can be thermally control by a thermal component 215. For example, each battery module 115 can have a separate cold plate. The battery pack 110 can include at least one member 315 that includes at least one bracket 300. The member 315 can include a plurality of brackets 300. For example, the member 315 can include at least one bracket 300 for each port of the thermal components 215. For example, the member 315 can provide brackets 300 to facilitate fluid coupling between the cooling line 210 and each of the thermal components 215.

The member 315 can extend along the cooling line 210. For example, the member 315 can extend parallel with the cooling line 210. The member 315 can provide a plurality of brackets 300 such that each connection point 815 along the cooling line 210 can fluidly couple with the member 315 to then fluidly couple with a thermal component 215.

Figure 9:
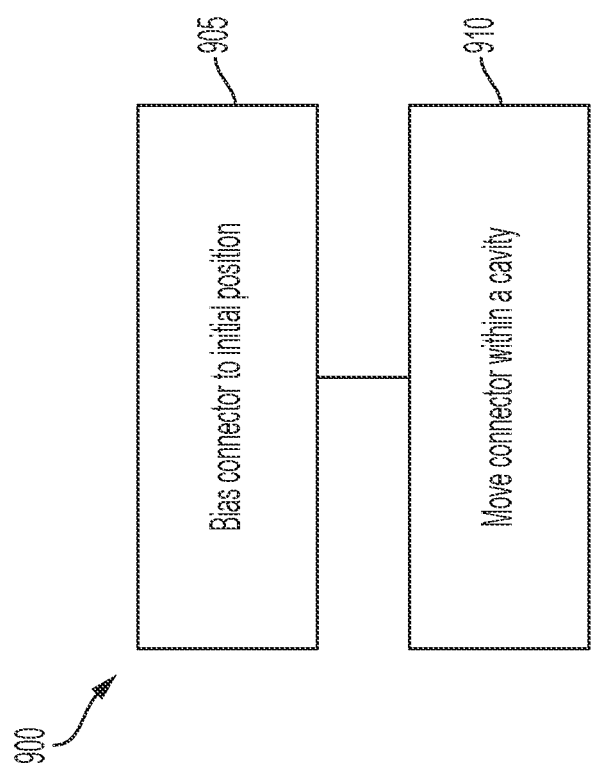
FIG. 9 depicts a flow diagram illustrating an example method to align components using a bracket, in accordance with some aspects.

FIG. 9 depicts an example method 900 to align components using a bracket 300. Method 900 can include biasing a connector 405 to an initial position within a cavity 320 of an apparatus, shown as bracket 300 (Act 905) and moving, responsive to receiving a load, the connector 405 within the cavity 320 (Act 910). Bracket 300 can include a body 305 and a spring element 325, 330. The body 305 can define a cavity 320. The cavity 320 can receive a connector 405. The spring element 325, 330 can extend from the body 305. The spring element 325, 330 can be disposed at least partially around the cavity 320. The spring element 325, 330 can bias the connector 405 to the initial position and facilitate the movement of the connector 405 within the cavity 320.

The bracket 300 can include a plurality of spring elements 325, 330. For example, the bracket 300 can include a first spring element 325, 330, a second spring element 325, 330, and a third spring element 325, 330. The first spring element 325, 330 and the second spring element 325, 330 can flex in a horizontal plane. For example, the first and second spring elements can be a first and second spring projection 325. The first and second spring projections 325 can flex within plane 310. The third spring element 325, 330 can flex within a vertical plane. For example, the third spring element can be a spring tab 330. The spring tab 330 can flex within plane 370. A portion of the third spring element 325, 330 can be disposed in the horizontal plane. For example, the head portion 365 of the spring tab 330 can be disposed in plane 310.

The first, second, and third spring elements can be any combination of spring elements 325, 330. For example, the first, second, and third spring elements can extend from the body 305 and flex within a horizontal plane. The first spring element can be disposed on a first side of the body 305, the second spring element can be disposed on a second side of the body 305, and the third spring element can be disposed on a third side of the body 305. The bracket 300 can include a recess 345 disposed on the third side of the body 305. The first side can be opposing the second side. The third spring element 325, 330 can be disposed, at least partially, within the recess 345.

At act 905, biasing the connector 405 to the initial position within the cavity 320 can include receiving the connector 405 within the cavity 320 via an opening 335. The opening 335 can be a space between a tip 340 of a first spring projection 325 and a tip 340 of a second spring projection 325. When receiving the connector 405, the first and second spring projections 325 can receive a load from the connector 405. The load can cause the first and second spring projections 325 to flex away from the connector 405 and increase the size of the opening 335 to allow for the connector 405 to enter the cavity 320.

When the connector 405 is disposed within the cavity 320, biasing the connector 405 to the initial position can include positioning the connector 405 centrally within the cavity 320. Biasing the connector 405 to the initial position can include positioning the connector 405 to a position within the cavity 320 based on an estimated position of an external element that the connector 405 is configured to receive. For example the connector can receive a fluid port 705 of a thermal component 215. The initial position of the connector 405 within the cavity 320 can be based on an estimated position of the fluid port 705. For example, for the fluid port 705 to enter the connector 405, the connector 405 can be aligned with a central axis of the fluid port 705.

At act 910, moving the connector 405 within the cavity 320 can include receiving a load (e.g., a force) from an external component. For example, the connector 405 can receive a load from the fluid port 705 of the thermal component 215. For example, the connector 405 can be misaligned from the fluid port 705 such that the fluid port contacts a surface of the connector 405 prior to entering into and being received by the connector 405. The load can cause the connector 405 to move radially within the cavity 320 from the initial position to a second position. As the connector 405 moves, the spring element 325, 330 of the bracket 300 can flex in the direction of the load. For example, if the load is pushing the connector 405 to the left, the spring element 325, 330 can flex to the left.

Moving the connector from the initial position to the second position can cause the connector 405 to align with the external component (e.g., the fluid port 705). For example, the connector 405 can align with a central axis of the fluid port 705 so the connector 405 can receive the fluid port 705. When the connector 405 has received the fluid port 705, the connector 405 can establish a liquid tight seal between the connector 405 and the fluid port 705.

If the load is removed from the connector 405, the connector can return to the initial position from the second position. For example, without a load applied to the connector 405, the spring elements 325, 330 can bias the connector 405 back to the predetermined initial position.

FIG. 10 depicts an example method 1000 to provide a bracket 300. Method 900 can include providing a bracket (Act 1005). The bracket 300 can include a body 305 defining a cavity 320. The cavity 320 can receive a connector 405. The bracket 300 can include a spring element 325, 330. The spring element 325, 330 can extend from the body. The spring element 325, 330 can be disposed at least partially around the cavity 320. The spring element 325, 330 can bias the connector 405 to an initial position and facilitate movement of the connector 405 within the cavity 320 when a load is applied to the connector 405. For example, the spring element can interface with a corresponding groove or pocket of the connector 405 to provide positioning control of the connector 405. The initial position can be a central position within the cavity 320. The movement of the connector 405 can include a radial movement within the cavity 320. For example, the radial movement can include movement in any radial direction. The movement can be, for example, up to 2 mm. The movement can be to facilitate proper alignment between the connector 405 and an external component (e.g., fluid port 705).

The bracket 300 can include a plurality of spring elements 325, 330. For example, bracket 300 can include a first spring element 325, 330, a second spring element 325, 330, and a third spring element 325, 330. The plurality of spring elements 325, 330 can be disposed, at least partially, around the cavity 320. The first and second spring elements 325, 330 can extend from the body 305. The first and second spring elements 325, 330 can flex in a horizontal plane (e.g., plane 310). The first spring element 325, 330 can be disposed on a first side of the body 305. The second spring element 325, 330 can be disposed on a second side of the body 305. The first side can be opposing the second side. The first and second spring elements 325, 330 can define an opening 335 at a front of the body 305. For example, the first and second spring elements 325, 330 can bend inward to define the opening 335. The opening 335 can provide the connector 405 access to the cavity 320. An end of the first spring element 325, 330 (e.g., tip 340) and an end of the second spring element 325, 330 (e.g., tip 340) can angle outward (e.g., away from each other) to facilitate entry of the connector 405 into the cavity 320. The third spring element 325, 330 can flex in a vertical plane (e.g., plane 370). A portion of the third spring element 325, 330 can be disposed in the horizontal plane. The third spring element 325, 330 can be disposed, at least partially, in a recess 345 on a third side of the body 305. The recess 345 can be disposed opposite the opening 335.

Some of the description herein emphasizes the structural independence of the aspects of the system components or groupings of operations and responsibilities of these system components. Other groupings that execute similar overall operations are within the scope of the present application. The systems described above can provide multiple ones of any or each of those components and these components can be provided on either a standalone system or on multiple instantiation in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, the nature or number of discrete elements or positions can be altered or varied, and the orientation of elements or components can be varied. Other substitutions, modifications, changes and omissions can also be made in the design, operating conditions and arrangement of the disclosed elements and operations without departing from the scope of the present disclosure.

For example, relative parallel, perpendicular, vertical or other positioning or orientation descriptions include variations within +/−10% or +/−10 degrees of pure vertical, parallel or perpendicular positioning. References to directions or orientations such as left, right front, back, horizontal, vertical, and others can be made with reference to the figures and vary based on the actual orientation of the components. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a body defining a cavity and a recess, the cavity configured to receive a connector, the recess disposed at a rear of the cavity opposite an opening;
a first spring element, a second spring element, and a third spring element that extend from the body, the first spring element and the second spring element disposed at least partially around the cavity and configured to bias the connector to enable movement of the connector within the cavity, the third spring element disposed at least partially in the recess; and
a member integral with the body, the member supported by a structural member of a battery pack, the structural member to define a compartment for a battery module of the battery pack, the member to position the connector within the battery pack to align with a port of a thermal component of the battery pack, the thermal component to cool the battery module of the battery pack.

2. The apparatus of claim 1, comprising:
the first spring element and the second spring element to horizontally flex; and
the third spring element to vertically flex.

3. The apparatus of claim 1, comprising:
the first spring element and the second spring element to flex within a horizontal plane; and
the third spring element to flex within a vertical plane, a portion of the third spring element disposed in the horizontal plane.

4. The apparatus of claim 1, comprising:
the first, second, and third spring elements to extend from the body and to at least flex horizontally, the first spring element disposed on a first side of the body, the second spring element disposed on a second side of the body, the first side opposing the second side, and the third spring element disposed, at least partially, in the recess on a third side of the body.

5. The apparatus of claim 1, comprising:
the first spring element and the second spring element defining the opening at a front of the body, the opening to provide the connector access to the cavity.

6. The apparatus of claim 1, comprising:
the first spring element and the second spring element disposed on opposing sides of the body, the first spring element and the second spring element bending inward to define the opening at a front of the body; and
an end of the first spring element and an end of the second spring element angling outward to facilitate entry of the connector into the cavity.

7. The apparatus of claim 1, comprising:
the first spring element, the second spring element, and the third spring element to bias the connector to an initial position, the initial position comprising a central position within the cavity of the apparatus; and
the movement of the connector comprising a radial movement within the cavity of the apparatus.

8. The apparatus of claim 1, comprising:
the first spring element, the second spring element, and the third spring element disposed, at least partially, around the cavity of the apparatus to facilitate radial movement of the connector within the cavity.

9. The apparatus of claim 1, comprising:
the first spring element, the second spring element, and the third spring element to facilitate radial movement of the connector within the cavity, the radial movement comprising up to 2 mm of movement in a radial direction.

10. The apparatus of claim 1, comprising:
the first spring element, the second spring element, and the third spring element to interface with a corresponding groove of the connector.

11. The apparatus of claim 1, comprising:
the first spring element, the second spring element, and the third spring element to facilitate radial movement of the connector within the cavity to facilitate proper alignment between the connector and an external component, the connector to fluidly couple a fluid line with the external component.

12. The apparatus of claim 1, wherein the apparatus is disposed in the battery pack of an electric vehicle, the battery pack comprising:
a cooling line fluidly coupled with the thermal component, the thermal component comprising a port to couple with the connector, the port and the connector to fluidly couple the cooling line with the thermal component.

13. A method, comprising:
biasing a component to an initial position within a cavity of an apparatus, the apparatus comprising:
- a body defining the cavity and a recess, the cavity configured to receive the component, the recess disposed at a rear of the cavity opposite an opening;
- a first spring element, a second spring element, and a third spring element extending from the body, the first spring element and the second spring element disposed at least partially around the cavity and configured to bias the component to the initial position and facilitate movement of the component within the cavity, the third spring element to bias the connector away from the recess; and
- a member integral with the body, the member supported by a structural member of a battery pack, the structural member to define a compartment for a battery module of the battery pack, the member to position the component to align with a thermal component of the battery pack, the thermal component to cool the battery module of the battery pack; and facilitating the movement of the component within the cavity, the movement comprising moving the component from the initial position to a second position within the cavity.

14. The method of claim 13, wherein biasing the component to the initial position comprises positioning the component centrally within the cavity.

15. The method of claim 13, wherein facilitating the movement of the component within the cavity comprises:
- flexing, responsive to receiving a load, at least one of the first spring element, the second spring element, or the third spring element in a direction based on the load;
- moving the component radially from the initial position to the second position; and
- returning the component from the second position to the initial position when the load is removed.

16. The method of claim 13, comprising:
receiving a load from an external component;
moving the component to align with the external component; and
establishing a liquid tight seal between the component and the external component.

17. A system, comprising:
a member supported by a structural member of a battery pack, the structural member to define a compartment for a battery module of the battery pack, the battery pack having a thermal component to cool the battery pack;
a bracket integral with the member, the bracket comprising:
- a body defining a cavity and a recess, the cavity configured to receive a component, the recess disposed at a rear of the cavity opposite an opening; and
- a first spring element, a second spring element, and a third spring element extending from the body, the first spring element and the second spring element disposed, at least partially, around the cavity and configured to bias the component to an initial position and facilitate movement of the component within the cavity, the third spring element disposed at least partially in the recess to bias the component away from the recess; and the member to position the component to align with the thermal component.

18. The system of claim 17, the bracket, comprising:
the first spring element and the second spring element to extend from the body and flex horizontally; and
the third spring element to extend from the body and flex vertically.

19. The system of claim 17, comprising:
the initial position comprising a central position within the cavity of the bracket; and
the movement of the component comprising a radial movement within the cavity of the bracket.

* * * * *